US012044156B2

(12) United States Patent
Carugati et al.

(10) Patent No.: US 12,044,156 B2
(45) Date of Patent: Jul. 23, 2024

(54) METHOD AND DEVICE FOR HEATING AN EXHAUST PIPE IN A MOTOR VEHICLE

(71) Applicant: ELDOR CORPORATION S.P.A., Orsenigo (IT)

(72) Inventors: Eugenio Carugati, Orsenigo (IT); Stefano Silva, Orsenigo (IT); Pasquale Forte, Orsenigo (IT)

(73) Assignee: ELDOR CORRPORATION S.P.A., Orsenigo (IT)

( * ) Notice: Subject to any disclaimer, the term of this patent is extended or adjusted under 35 U.S.C. 154(b) by 0 days.

(21) Appl. No.: 18/263,867

(22) PCT Filed: Jan. 31, 2022

(86) PCT No.: PCT/IB2022/050812
§ 371 (c)(1),
(2) Date: Aug. 1, 2023

(87) PCT Pub. No.: WO2022/167912
PCT Pub. Date: Aug. 11, 2022

(65) Prior Publication Data
US 2024/0102409 A1 Mar. 28, 2024

(30) Foreign Application Priority Data

Feb. 3, 2021 (IT) .................. 102021000002288

(51) Int. Cl.
*F01N 3/20* (2006.01)
*F01N 3/025* (2006.01)
(Continued)

(52) U.S. Cl.
CPC ............ *F01N 3/2033* (2013.01); *F01N 9/00* (2013.01); *F01N 3/025* (2013.01); *F01N 3/0253* (2013.01);
(Continued)

(58) Field of Classification Search
CPC ...... F01N 3/025; F01N 3/0253; F01N 3/0256; F01N 3/027; F01N 3/0275; F01N 3/2013;
(Continued)

(56) References Cited

U.S. PATENT DOCUMENTS 5,253,475 A * 10/1993 Kabasin ................ F01N 3/2033
60/284
5,947,077 A * 9/1999 Yonezawa ........... F02D 41/1497
123/406.47

(Continued)

OTHER PUBLICATIONS

International Search Report and Written Opinion dated May 9, 2022 from cunterpart International Patent Applicatio No. PCT/IB2022/050812.

*Primary Examiner* — Binh Q Tran
(74) *Attorney, Agent, or Firm* — SHUTTLEWORTH & INGERSOLL, PLC; Timothy J. Klima

(57) ABSTRACT

A method for heating an exhaust pipe in a motor vehicle, comprising including a plurality of spark cycles performed in succession at a preset frequency, wherein each spark cycle includes injecting a-preset fuel quantity into an injection area inside of an exhaust pipe in a motor vehicle and generating at least one spark between the ends of a pair of electrodes located in proximity to the injection area in order to start combustion.
Thus, a value of an ionization current flowing between the ends of the pair of electrodes is detected following the extinction of the spark and this ionization current value is compared with a preset reference value.
Therefore, the presence of combustion in the spark cycle is determined, if the ionization current value is greater than the preset reference value, or the absence of combustion in the spark cycle, if the ionization current value is lower than the preset reference value.

12 Claims, 2 Drawing Sheets

(51) Int. Cl.
*F01N 3/027* (2006.01)
*F01N 9/00* (2006.01)

(52) U.S. Cl.
CPC ............ *F01N 3/0256* (2013.01); *F01N 3/027* (2013.01); *F01N 3/0275* (2013.01); *F01N 3/204* (2013.01); *F01N 2240/14* (2013.01); *F01N 2240/16* (2013.01); *F01N 2610/105* (2013.01); *F01N 2610/107* (2013.01)

(58) Field of Classification Search
CPC .......... F01N 3/2033; F01N 3/204; F01N 3/36; F01N 3/38; F01N 9/00; F01N 2240/12; F01N 2240/14; F01N 2240/16; F01N 2550/22; F01N 2610/03; F01N 2610/102; F01N 2610/105; F01N 2610/107; F01N 2900/0602; F02D 35/021
See application file for complete search history.

(56) References Cited

U.S. PATENT DOCUMENTS

| | | | | |
|---|---|---|---|---|
| 6,318,077 | B1 * | 11/2001 | Claypole | F01N 3/2006 60/303 |
| 2005/0150221 | A1 * | 7/2005 | Crawley | F23N 5/022 60/297 |
| 2007/0186903 | A1 * | 8/2007 | Zhu | F02P 5/1523 123/406.28 |
| 2007/0266772 | A1 * | 11/2007 | Kawakami | F02D 19/0649 73/35.16 |
| 2009/0126461 | A1 * | 5/2009 | Liu | G01L 23/225 73/35.08 |
| 2009/0241520 | A1 | 10/2009 | Gendron et al. | |
| 2010/0186384 | A1 * | 7/2010 | Gonze | F01N 3/025 60/320 |
| 2012/0323463 | A1 * | 12/2012 | Hashima | F01N 11/002 701/102 |

* cited by examiner

METHOD AND DEVICE FOR HEATING AN EXHAUST PIPE IN A MOTOR VEHICLE

This application is the National Phase of International Application PCT/IB2022/050812 filed Jan. 31, 2022 which designated the U.S.

This application claims priority to Italian Patent Application No. 102021000002288 filed Feb. 3, 2021, which applications are incorporated by reference herein.

This invention relates to a method and device for heating an exhaust pipe in a motor vehicle.

This invention thus finds its main application in the automotive sector, in particular in designing control systems for reducing pollutants in exhaust pipe catalytic converters.

In the automotive sector, in fact, the requirement from public administrations to reduce pollutants at each step for starting an endothermic engine is now increasingly urgent.

From this perspective, it is essentially important that the catalytic included in the exhaust pipe always operates at a temperature close to its working temperature, usually ranging between 300 and 1100° C.

This is not particularly problematic when the vehicle has been in use for a few minutes, with the exhaust fumes having brought the exhaust to the right temperature, but it is a critical element for starting the engine, with the exhaust pipe at ambient temperature.

For this reason, in the prior art, solutions have been proposed that involve using a burner operationally placed upstream of the catalytic converter and designed to heat the exhaust pipe when the engine starts up.

This solution, in any case, introduces significant issues in terms of equipping the pipe with sensors. Inside of the pipe, both the temperature and the balance of the combustion air mixture must be monitored, especially considering that the automotive manufacturers require that there is a lean mixture in the burner.

The purpose of this invention is, therefore, to overcome these drawbacks and, in particular, to provide a method and device for heating an exhaust pipe in a motor vehicle requiring limited sensors and, at the same time, makes it possible to optimise the combustion process.

Said purposes are achieved with a method and device for heating an exhaust pipe in a motor vehicle having the features listed in the claims below.

In particular, the method comprises injecting a preset quantity of fuel and comburent into an injection area inside the exhaust pipe of a motor vehicle and performing a plurality of spark cycles in succession.

Each spark cycle proceeds to generate at least one spark between the ends of a pair of electrodes located in proximity to the injection area in order to start combustion.

Thus, the value of a representative quantity of an ionization current flowing between said ends of the pair of electrodes following the extinction of said spark is detected.

This value of the representative quantity is compared with a preset reference value.

According to the invention, depending on the outcome of said comparison, the following are determined:
the presence of combustion in the spark cycle if said value of the representative quantity is greater than said preset reference value;
the absence of combustion in the spark cycle if said value of the representative quantity is less than said preset reference.

Thus, in the same spark cycle or in a subsequent cycle, information relating to the absence or presence of combustion, according to the outcome of said comparison, is generated.

Advantageously, this makes it possible to detect and keep monitoring the combustion inside the exhaust pipe without needing to add any additional sensor and exploiting the spark plug/electrodes in this sense.

This invention also relates, as mentioned, to a device for heating an exhaust pipe in a motor vehicle.

Said device preferably comprises at least one injector that can face, internally, said exhaust pipe and an ignition device.

The ignition device is provided with a coil having a primary winding and a secondary winding, a pair of electrodes wherein a first electrode is arranged in series and said secondary winding and a second electrode is spaced apart from the first so as to create an air gap with preset dimensions and a drive circuit of said coil provided with at least one switch connected to the primary winding.

According to the invention, the device comprises an ionization current detection circuit connected to said secondary winding of the coil and a control system.

The control system is preferably configured to
receive an ionization current signal from said detection circuit;
compare said ionization current signal, or a signal related thereto, with a reference signal or value;
send a drive signal to the drive circuit for driving said coil and/or a control signal to the injector that varies according to the outcome of said comparison.

Advantageously, the device is, thus, structurally simple and inexpensive, also providing the manufacturer with significant flexibility in the type of signal to supply as output following the detection of the ionization current. The dependent claims, incorporated herein for reference, correspond to different embodiments of the invention.

Additional features and advantages of this invention will be clearer from the indicative, and therefore non-limiting, description of one preferred, but not exclusive, embodiment of a method and device for heating an exhaust pipe in a motor vehicle, as illustrated in the attached drawings wherein:

FIG. 1 schematically shows an exhaust pipe for a motor vehicle provided with a heating device according to this invention;

Figure 1:
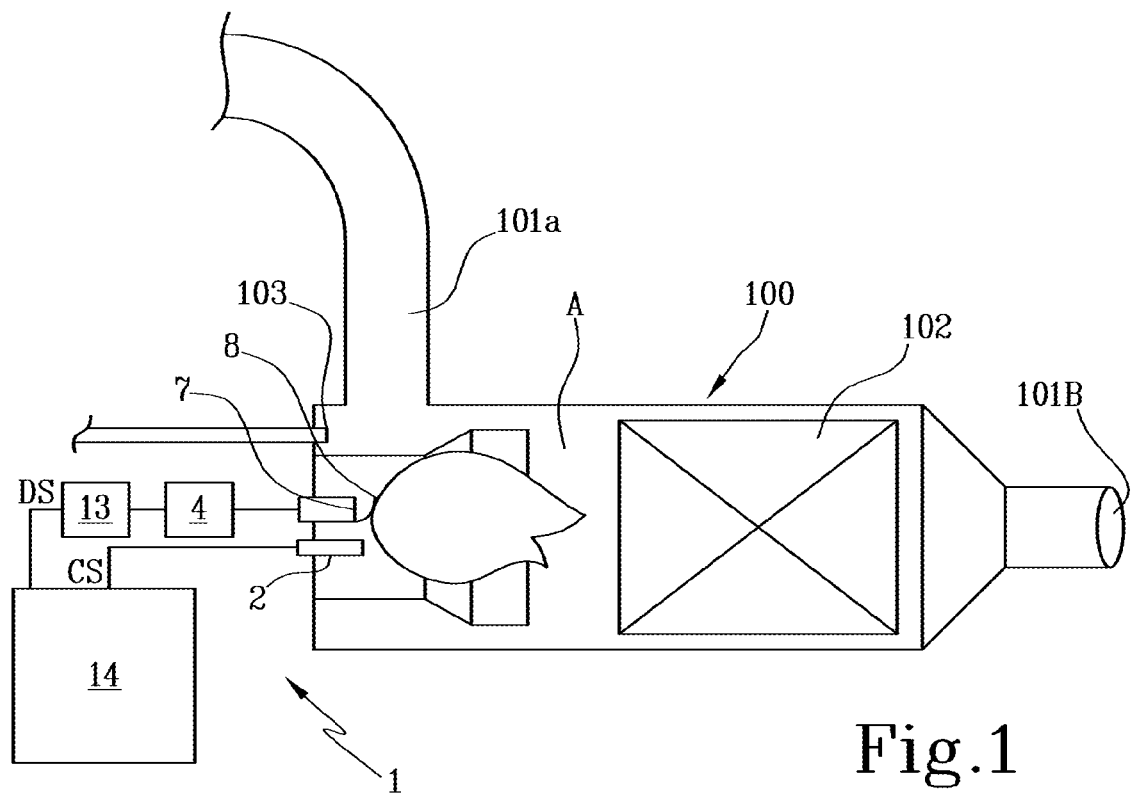

With reference to the attached figures, the reference number 1 denotes a heating device for an exhaust pipe of a motor vehicle in accordance with this invention.

The device 1 is, thus, connected to an exhaust pipe 100 of a motor vehicle and comprises one or more components housed at least partially inside of it.

The exhaust pipe 100 comprises, in particular, a tubular element 101 extending between at least one first opening 101a and a second opening 101b for exhaust.

The first opening 101a is placed in connection with an exhaust mouth of the cylinders or main cylinder, receiving the fumes therefrom.

Inside the exhaust pipe 100, there is, preferably, a catalytic converter 102. The heating device 1 has multiple components positioned operationally upstream of the catalytic converter 102, in particular between the first opening 101a and the catalytic converter 102 itself.

In more detail, the device 1 comprises at least one injector 2 and at least one ignition device 3.

The injector 2 is positioned inside the exhaust pipe 100, within an injection area "A".

More precisely, the injector 2 is positioned operationally downstream of the first opening 101a.

Near the injector 2, there is also an intake mouth 103 placed in fluidic connection with a comburent agent intake, preferably with the air intake pipe.

In this way, thanks to the intake mouth 103 it is possible to release a preset quantity of comburent (i.e., air) inside of the exhaust pipe 100, preferably in the injection area 2.

The injector 2 is, in turn, connected with a fuel tank (not illustrated) and configured to deliver to the exhaust pipe 100 (in particular in the injection area "A") a quantity of fuel proportional to an opening time of a corresponding injector.

In other words, the injector is selectively switched between an open condition and a closed one, the proportion of which within each working cycle determines the quantity of fuel injected into the exhaust pipe (and, therefore, the comburent/fuel ratio).

The ignition device 3 is, in contrast, configured to generate at least one spark (preferably a sequence of sparks) between the ends of a pair of electrodes 7, 8 placed near the injection area "A" in order to start combustion between fuel and comburent (air).

The ignition device 3 is preferably provided with a coil 4, a pair of electrodes 7, 8, and a drive circuit 9 of the coil 4.

The coil 4 comprises a primary winding 5 and a secondary winding 6, preferably wound around the same magnetic core and spaced apart from by an insulating layer.

The primary winding 5, which is provided with a first and a second end, can be connected, by means of an electric connection, to a voltage generating device (e.g., a battery).

The secondary winding 6 is, in contrast, connected to an end provided with a pair of electrodes 7, 8 preferably defined by an ignition spark plug.

In particular, the first electrode 7 is arranged in series with said secondary winding 6 and the second electrode 8 is spaced from the first electrode 7 so as to create an air gap of a predetermined size.

It should be noted that the primary winding 5 comprises a first number of loops, while the secondary winding 5 comprises a second number of loops greater than the first in order to exploit the loop ratio so as to increase the voltage in the secondary winding and generate a spark between the two electrodes.

The drive circuit 9 is connected to a switch 10 connected to the primary winding 5 and able to be driven when open and/or closed in order to prevent or enable, respectively, the passage of current through said primary winding 5.

In the preferred embodiment, the primary winding 5 is placed between the electric connection and the switch 10.

Thus, the switch 10 is preferably connected to the second end of the primary winding 5.

The switch 10 is preferably a static one; more preferably, to enable the efficient and reliable management of the charges in play, the switch 10 is an insulated gate bipolar transistor (commonly called an IGBT).

This switch 10 thus has:
- a first node, or connector, connected to the primary winding 5,
- a second node, or emitter, connected to earth, and
- a third node, or gate, that can be driven via the drive circuit 9 to enable the switch 10 itself to be opened or closed.

The drive circuit 9 is, therefore, arranged to receive a drive signal DS and to drive, or guide, the switch into the closed or open position as a result.

The device 1 also comprises an ionization current detection circuit 11 associated with the secondary winding 6 of the coil 4.

It should be noted that the expression "ionization current" is intended to define that current (or, potentially, another quantity) representing the ionization that is generated in the secondary winding as a result of the ionization of air between the two electrodes 7, 8.

Below, reference will be made, therefore, to measuring the "ionization current" where this expression is intended to define that current that is generated as a result of the ionization and that, therefore, defines the measurement parameter thereof.

Therefore, this detection circuit 11 is configured to generate a signal representing the ionization current, which may be a current signal, a voltage signal, or, again, a signal of another kind. In the preferred embodiment, the ionization current signal IS is a voltage signal.

This detection circuit 11 is placed in series with the secondary winding 6 and the spark plug, creating a closed grid through the electric mass of the engine.

Preferably, it comprises a polarisation circuit 11a and a measuring circuit 11b.

The polarisation circuit 11a preferably comprises a capacitor and a Zener diode (not illustrated).

Its function is to polarise, with a voltage typically ranging between 50V and 400V, the central electrode 7 of the spark plug. In this way, the electrode may attract negatively charged ions generating a current in the electric circuit.

The capacitor is charged by the spark current generated by the secondary winding 6 and the Zener diode limits the voltage at its ends in the event that the power delivered by the coil may charge the capacitor with a voltage value that it cannot tolerate.

The measuring circuit 11b is designed to transform the current signal into information that the system can use.

In its simplest form, it comprises a resistor converting the current signal into a voltage signal according to Ohm's law. This voltage signal can be more easily used in a comparison circuit or acquired with an analogue/digital converter.

In some embodiments, there may be a diode in parallel to the resistor. This diode ensures a low impedance path wherein only the spark current flows.

The measuring resistor will, thus, only be traversed by the ionization current flowing in the opposite direction to the spark current.

According to one aspect of the invention, the device comprises, in addition, a control system 12 configured to generate the drive signal DS for the drive circuit 9 of the coil depending on the ionization current detected by the detection circuit 11.

In particular, the control system 12 is configured to receive the ionization current signal IS from the detection circuit 11, compare said ionization current signal IS (or a signal related thereto) with a reference signal or value, and send the drive signal DS to the drive circuit 9 of said coil 4 and/or a control signal CS to the injector 2.

The drive signal DS and/or the control signal CS are, advantageously, variable depending on the outcome of said comparison, so as to enable the coil to be driven in line with the state of combustion inside the exhaust pipe 100.

The control system 12 preferably comprises a control unit 13 that can be associated (or connected) with an external controller 14, preferably corresponding to the engine control unit.

The control unit 13 is connected to the detection circuit 11 in order to receive the ionization current signal IS and is configured to generate a signal having information that varies depending on the outcome of the comparison.

This signal is sent to the external controller 14, which is configured to receive said signal and send the drive signal DS, which varies depending on the outcome of said comparison, to the drive circuit 9 of said coil 4.

Alternatively, or as well, the external controller 14 is configured to send a control signal CS, which varies depending on the outcome of said comparison, to the injector 2.

More precisely, the external controller 14 is configured to send a control signal CS, which varies depending on the value of said ionization current signal IS or of said drive signal DS, to the injector 2.

It should be noted that the signal generated by the control unit 13 may be a first signal S1 or a second signal S2.

In the embodiment wherein the first signal S1 is generated, this signal has, alternatively:
a first piece of information if the signal ION is greater than the reference value or signal;
a second piece of information if said signal ION is lower than the reference value or signal.

In other words, the first signal S1 is an ON-OFF type signal that can only assume two different values representing the achievement, or not, of a predefined condition (combustion—editor's note).

In this embodiment, thus, the comparison is performed by the control unit 13, which provides as output information relating to the presence or absence of a flame (combustion) but not proportionally linked to the value of the ionization current.

Therefore, in this embodiment, the control unit 13 is configured to perform the comparison "internally", i.e., in order to compare the signal ION with the reference signal or value and to generate the first signal S1 with the first or second piece of information depending on the outcome of the comparison.

Alternatively (or as well), the control unit 13 is configured to generate a second signal S2 related to said ionization current signal IS and itself representing a value of said ionization current.

In other words, the second signal S2 has a value proportional to the value (amplitude) of the ionization current and, in contrast to the first signal S1, does not contain information that, in itself, represents the presence of combustion, or lack thereof.

Therefore, in this embodiment, the external controller 14 is preferably configured to receive said second signal S2, to compare said second signal S2 with the reference signal or value, sending, respectively, a drive signal DS or a control signal CS, which varies depending on the outcome of said comparison, to the drive circuit 9 of the coil 4 and/or to the injector 2.

Therefore, the drive circuit 9 for driving the coil 4 is preferably configured to start a spark cycle upon receiving a drive signal DS from said control system 12, wherein said drive signal DS is related to the signal ION generated by said detection circuit 4 in the preceding spark cycle.

The signal generated by the control unit 13, whether a first signal S1 or a second signal S2, may be of various kinds.

Figure 2:
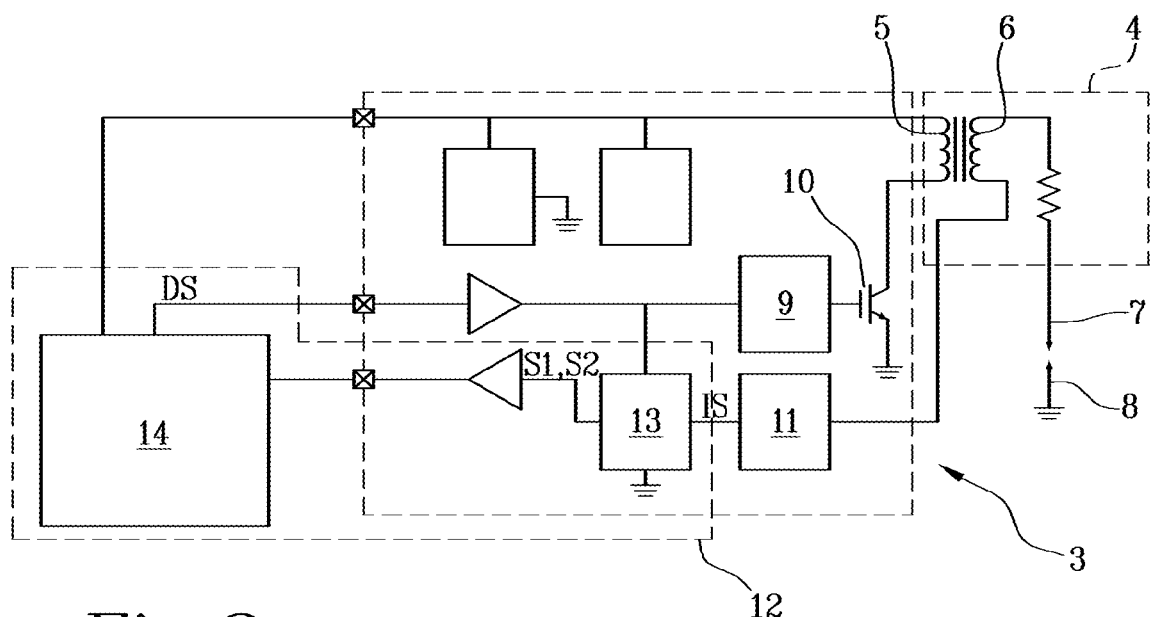
FIG. 2 shows a diagram relating to an ignition device of the heating device in FIG. 1 in a first embodiment thereof.
Figure 3:
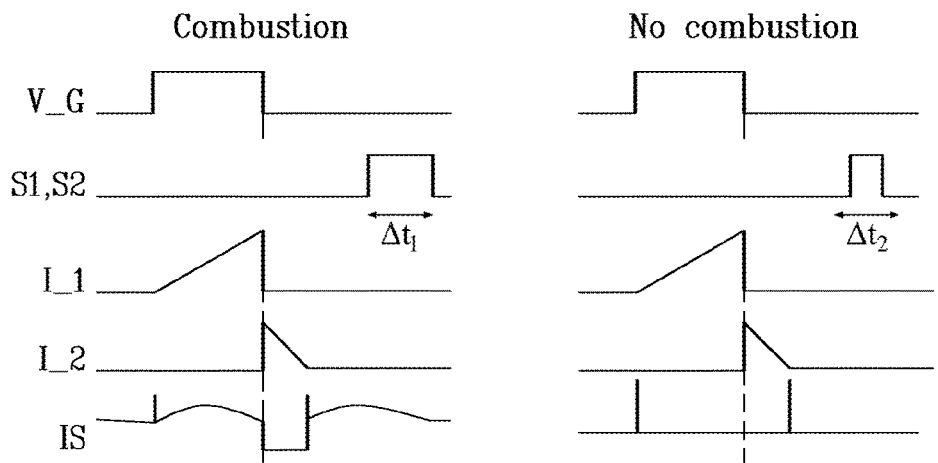
FIG. 3 shows the curves that are characteristic of a method for heating an exhaust pipe in a motor vehicle driven via the device in FIG. 2.

In a first embodiment of this invention, illustrated in FIGS. 2 and 3, the signal generated by the control unit 13 is a voltage signal that has a preset amplitude with a variable duration depending on the value of the signal ION.

In this embodiment, the control unit 13 preferably comprises:
a first input terminal designed to receive the ignition signal V_G,
a second input terminal designed to receive the signal ION, preferably a voltage signal representing the ionization current value,
an output terminal designed to generate the first S1 or second signal S2, In particular, according to this embodiment, the first signal S1 would be a voltage signal that has a preset amplitude and duration, alternatively equal to:
a first time interval corresponding to said first piece of information,
a second time interval corresponding to said second piece of information.

For example, with reference to what is illustrated in FIG. 3, it is possible to note how, as a result of the closure of the switch (gate signal V_G), the primary winding 5 begins to charge (signal I_1).

At the end of the charging step, the switch is opened, leading to a voltage/current peak in the secondary winding 6 (signal I_2) and to the generation of a spark between the electrodes 7, 8 identified by the ionization current peak of the signal ION.

If the spark triggers combustion (FIG. 3 "combustion"), the ionization current continues to flow into the secondary circuit 6 and is detected by the detection circuit 11.

The control unit 13, in this case, generates, in the same spark cycle or in a subsequent cycle, a first signal S1 of the same duration as the first-time interval $\Delta T_1$.

In contrast, if the spark is not enough to trigger combustion (FIG. 3 "no combustion"), the ionization current tends to be zero when the arc is extinguished.

In this case, the control unit 13 generates, in the same spark cycle or in a subsequent cycle, a first signal S1 of the same duration as the second time interval $\Delta T_2$.

Similar considerations may be made for the embodiment wherein the control unit 13 generates a signal with a value proportional to the value of the ionization current signal IS of the ionization current, i.e., the second signal S2.

In this case, a voltage signal is generated as output from the control unit 13 the duration of which does not alternatively assume two values, but will have a value that varies between two extremes proportional to the value of the ionization current signal IS (this case is not illustrated).

Figure 4:
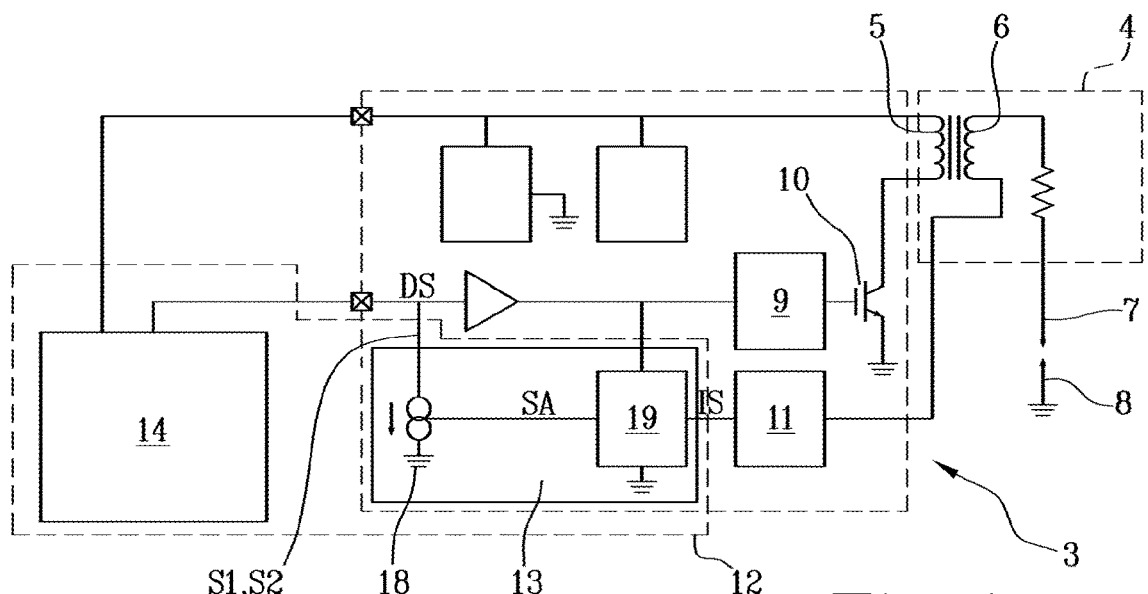
FIG. 4 shows a diagram relating to an ignition device of the heating device in FIG. 1 in a second embodiment thereof.
Figure 5:
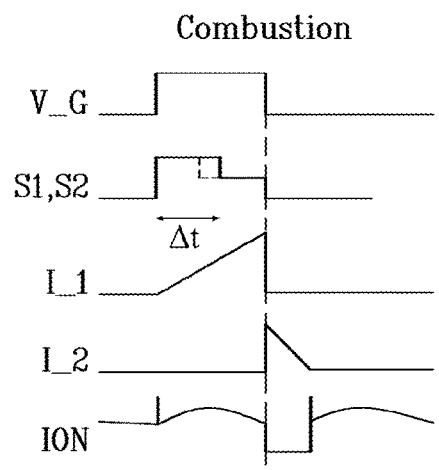
FIG. 5 shows the curves that are characteristic of a method for heating an exhaust pipe in a motor vehicle driven via the device in FIG. 4.

Alternatively, with reference to FIGS. 4 and 5, the signal generated by the control unit 13 is a current signal, in particular an ionization current signal of a current absorption having a preset amplitude and variable duration.

In this embodiment, the control unit 13 comprises a current generator 18 controlled depending on the ionization current signal IS.

In this way, it is, advantageously, possible to avoid the use of an additional connection between the control unit 13 and the external controller 14 to transfer the first S1 or second signal S2 (FIG. 4).

In particular, the current generator 18 is configured to generate the first S1 or second signal S2 in the form of current and has a value that depends on the value of the ionization current signal IS.

More specifically, the control unit 13 comprises:
a computer 19 configured to generate a control signal SA depending on the value of the ionization current signal IS;
the current generator 18 configured to generate the first S1 or second signal S2 in the form of a current signal having a value that depends on the control signal SA.

For example, in a variant of the invention, the distance between two variations of a pulse signal generated by the control unit (FIG. 5) is used to determine:
the presence or absence of combustion in the previous cycle, if the signal is a first signal S1;
the amplitude value of the ionization current of the previous spark cycle, if the signal is a second signal S1.

This invention also concerns a method for heating an exhaust pipe 100 in a motor vehicle, which can, preferably but not necessarily, be activated via the heating device 1 described up until this point.

We will proceed, therefore, below to describe the method in more detail, underlining that until now all the features mentioned and described in relation to the device, where not expressly identified or if incompatible, are to be considered applicable mutatis mutandis to the following description of the method that is the subject of this invention.

The method involves, in the first instance, injecting a predetermined quantity of fuel and comburent into an injection area "A" inside an exhaust pipe 100 in a motor vehicle.

Thus, multiple spark cycles are performed in succession, preferably at a preset frequency.

Each spark cycle preferably involves generating at least one spark between the ends of a pair of electrodes 7, 8 located in proximity to the injection area "A" in order to start combustion.

As a result of the extinction of said spark, a value of the ionization current flowing between said ends of the pair of electrodes 7, 8 is detected.

It should be noted that a quantity other than the ionization current could also be detected, but, in any case, one related thereto and representing it.

The ionization current is, preferably, constantly detected, but as far as regards the subject of the invention, what is most important is the monitoring of the value of the ionization current following the extinction of the spark, the moment when it is possible to detect the presence, or lack thereof, of combustion in the exhaust pipe.

The ionization current value (or the value of a quantity representing the ionization current) with a preset reference value.

Depending on the outcome of this comparison, the presence or absence of combustion in the reference spark cycle is, thus, determined.

In particular, the following are determined:
the presence of combustion in the spark cycle if said ionization current value is greater than said preset reference value;
the absence of combustion in the spark cycle if said ionization current value is less than said preset reference value.

At this point, in the same spark cycle or in a subsequent cycle, information relating to the absence or presence of combustion according to the outcome of said comparison is generated.

More specifically, each spark cycle involves:
receiving information on the presence or absence of combustion in a previous spark cycle;
starting a further spark cycle if said information is representative of an absence of combustion;
stopping or delaying said further spark cycle if said information is representative of the presence of combustion.

In addition, the method preferably involves driving the injector 2 depending on the value of the ionization current detected in a previous spark cycle; in other words, therefore, the method involves determining the opening time of the injector 2 depending on the result of said comparison and/or of an ionization current value detected in a previous cycle.

The invention achieves the purposes proposed and entails significant advantages.

In fact, the possibility of detecting the presence, or lack thereof, of a flame in the exhaust pipe via the use of the spark plug as a sensor, while also being able to remodulate the output signal so as to determine the level of ionization current, is very advantageous both in terms of the system's structural simplicity and its reliability.

The invention claimed is:

1. A method for heating an exhaust pipe in a motor vehicle, comprising the steps of:
injecting a predetermined quantity of fuel and comburent into an injection area (A) inside an exhaust pipe in a motor vehicle;
performing a plurality of spark cycles in succession, wherein each spark cycle comprises:
generating at least one spark between ends of a pair of electrodes located in proximity to the injection area to start a combustion;
detecting a value of a representative quantity representing an ionization current flowing between said ends of the pair of electrodes following an extinction of said at least one spark;
comparing said value of the representative quantity representing the ionization current with a preset reference value and determining:
a presence of combustion in the spark cycle if said value of the representative quantity is greater than said preset reference value;
an absence of combustion in the spark cycle if said value of the representative quantity is less than said preset reference value;
generating, in the same spark cycle or in a subsequent cycle, information relating to the absence or presence of combustion according to the outcome of said comparison.

2. The method according to claim 1, wherein each spark cycle comprises:
receiving information on the presence or absence of combustion in a previous spark cycle;
starting a further spark cycle if said information is representative of an absence of combustion;
stopping or delaying said further spark cycle if said information is representative of a presence of combustion.

3. The method according to claim 1, wherein, at an end of said plurality of spark cycles and in the absence of combustion, said fuel injection is stopped.

4. The method according to claim 1, wherein said fuel injection step comprises delivering a quantity of fuel into the exhaust pipe, which is proportional to an opening time of a corresponding injector; said method further comprising establishing said opening time as a function of the value of the ionization current detected in a previous, immediately preceding, spark cycle.

5. A heating device for an exhaust pipe of a motor vehicle, comprising:

at least one injector which is configured to face an inside of said exhaust pipe;

an ignition device including
- a coil having a primary winding and a secondary winding;
- a pair of electrodes, wherein a first electrode is arranged in series with said secondary winding and a second electrode is spaced from the first electrode to create an air gap of a predetermined size;
- a drive circuit for driving said coil which includes at least one switch operatively connected with the primary winding;

an ionization current detection circuit operatively connected with said secondary winding of the coil;

a control system configured for:
- receiving an ionization current signal from said ionization current detection circuit;
- comparing said ionization current signal or a signal related thereto with a reference signal or value;
- sending a drive signal to the drive circuit for driving said coil and/or a control signal to the injector, wherein said drive signal and/or said control signal vary according to an outcome of said comparison.

6. The device according to claim 5, wherein said control system comprises a control unit configured to be operatively connected with an external controller; said control unit being configured for:
- receiving said ionization current signal from said ionization current detection circuit;
- comparing the value of said ionization current signal or of a signal related thereto with said reference signal or value;
- generating a first signal having a first information content if said ionization current signal is greater than said reference signal or value and a second information content if said ionization current signal is less than said reference signal or value.

7. The device according to claim 6, wherein said first signal is either:
- a voltage signal having a duration which varies between a first-time interval, corresponding to said first information content, and a second time interval, corresponding to said second information content; or
- a current signal representative of current absorption and having a constant amplitude and a duration which varies between the first-time interval, corresponding to said first information content, and the second time interval, corresponding to said second information content.

8. The device according to claim 5, wherein said control system comprises a control unit configured to be operatively connected with an external controller; said control unit being configured for:
- receiving said ionization current signal;
- generating a second signal related to said ionization current signal and representative of a value of said ionization current.

9. The device according to claim 8, wherein said external controller is configured to receive said second signaler, compare said second signal with said reference signal or value, and send:
- a drive signaler, which varies according to the outcome of said comparison, to the drive circuit for driving said coil and/or
- a control signal, which varies according to the outcome of said comparison, to the injector.

10. The device according to claim 8, wherein said second signal is either:
- a voltage signal having a duration which varies proportionally to a value of said ionization current signal representative of the ionization current; or
- a current signal representative of current absorption and having a constant amplitude and a duration which varies proportionally to the value of said ionization current signal representative of the ionization current.

11. The device according to claim 5, wherein the drive circuit for driving the coil is configured to start a spark cycle upon receiving a drive signal by said control system, wherein said drive signal is related to the ionization current signal generated by said detection circuit in a preceding spark cycle.

12. The device according to claim 5, wherein the control system is configured to send to the injector a control signal representative of an opening time of said injector, which varies according to a value of said ionization current signal or of said drive signal.

* * * * *